(12) United States Patent
Sumiyashiki et al.

(10) Patent No.: US 6,352,213 B1
(45) Date of Patent: Mar. 5, 2002

(54) WEBBING RETRACTOR

(75) Inventors: Akira Sumiyashiki; Katsuki Asagiri, both of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/536,019

(22) Filed: Mar. 27, 2000

(30) Foreign Application Priority Data

Apr. 16, 1999 (JP) .......................................... 11-109584

(51) Int. Cl.$^7$ ......................... B60R 22/38; B65M 75/48
(52) U.S. Cl. .................................................. 242/383.2
(58) Field of Search ........................... 242/383.2, 383.3, 242/383.4, 383.5; 280/806; 297/478

(56) References Cited

U.S. PATENT DOCUMENTS

| 3,865,329 | A | * | 2/1975 | Higbee et al. | ............ | 242/107.4 |
| 4,258,887 | A | * | 3/1981 | Fohl et al. | ............. | 242/107.4 A |
| 4,564,154 | A | * | 1/1986 | Takada | ................ | 242/107.4 B |
| 4,565,338 | A | * | 1/1986 | Takada | ................ | 242/107.4 B |
| 4,858,847 | A | * | 8/1989 | Ogris | .................. | 242/107.4 B |
| 5,485,971 | A | * | 1/1996 | Nakaya et al. | ............ | 242/381.1 |
| 5,593,105 | A | * | 1/1997 | Schmid et al. | ............ | 242/383.4 |
| 5,788,281 | A | * | 8/1998 | Yanagi | ........................ | 280/806 |
| 5,921,496 | A | * | 7/1999 | Matsuki et al. | .......... | 242/383.2 |
| 6,068,208 | A | * | 5/2000 | Matsuki et al. | .......... | 242/383.2 |

FOREIGN PATENT DOCUMENTS

WO     WO-96/28321     *  9/1996

* cited by examiner

Primary Examiner—Donald P. Walsh
Assistant Examiner—Joseph Rodriguez
(74) Attorney, Agent, or Firm—Nixon Peabody LLP; Thomas W. Cole

(57) ABSTRACT

A webbing retractor for webbing belt retraction and restraint of a vehicle occupant during sudden deceleration. In a preferred embodiment, the webbing retractor includes a spring, and is for connection to an axially rotatable shaft having a locking device. The locking device includes a rotator coaxially rotatable with the shaft and a locking mechanism. The spring resiliently urges the shaft to retract the webbing belt, which can be ordinarily unwound against the spring tension. During sudden deceleration, the locking mechanism is activated and limits or prevents unwinding of the webbing belt. The retractor includes wall portions provided at the rotator and the shaft, with the spring disposed between these portions. A hole for insertion of the spring is provided between the wall portions. The hole is sized such that the spring must be at least partially compressed for insertion therethrough. The arrangement facilitates insertion of the spring, and stable connection of the spring in the assembly.

18 Claims, 9 Drawing Sheets

F I G. 1
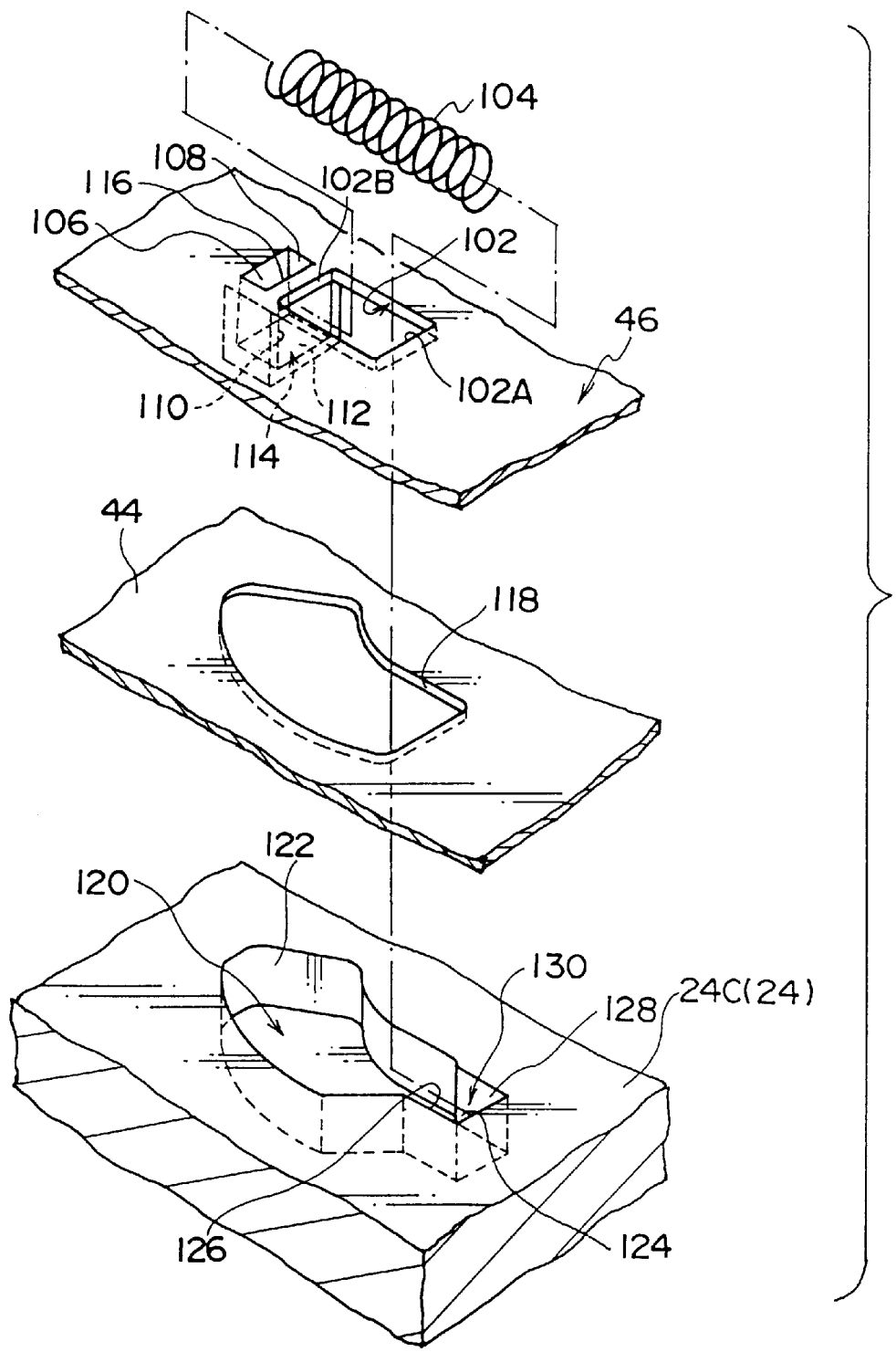

F I G. 3
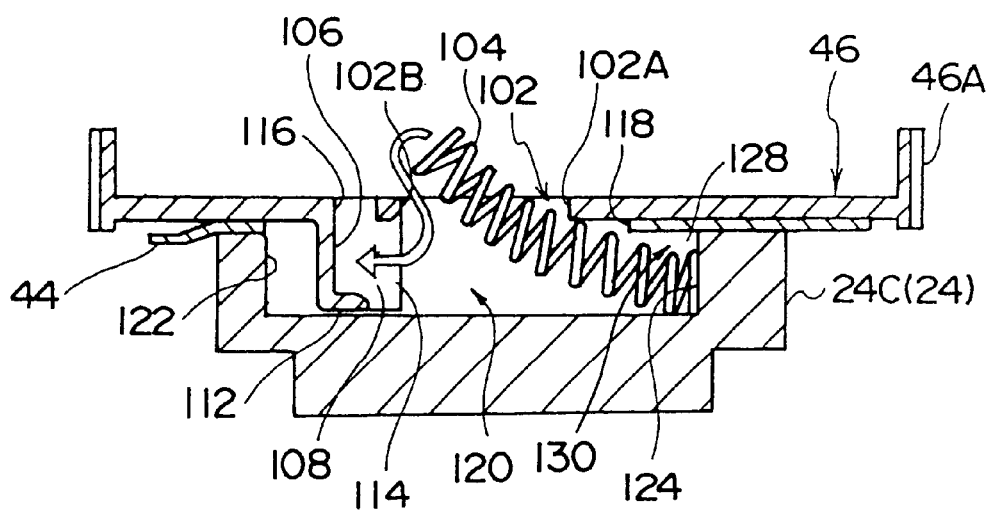

F I G. 4
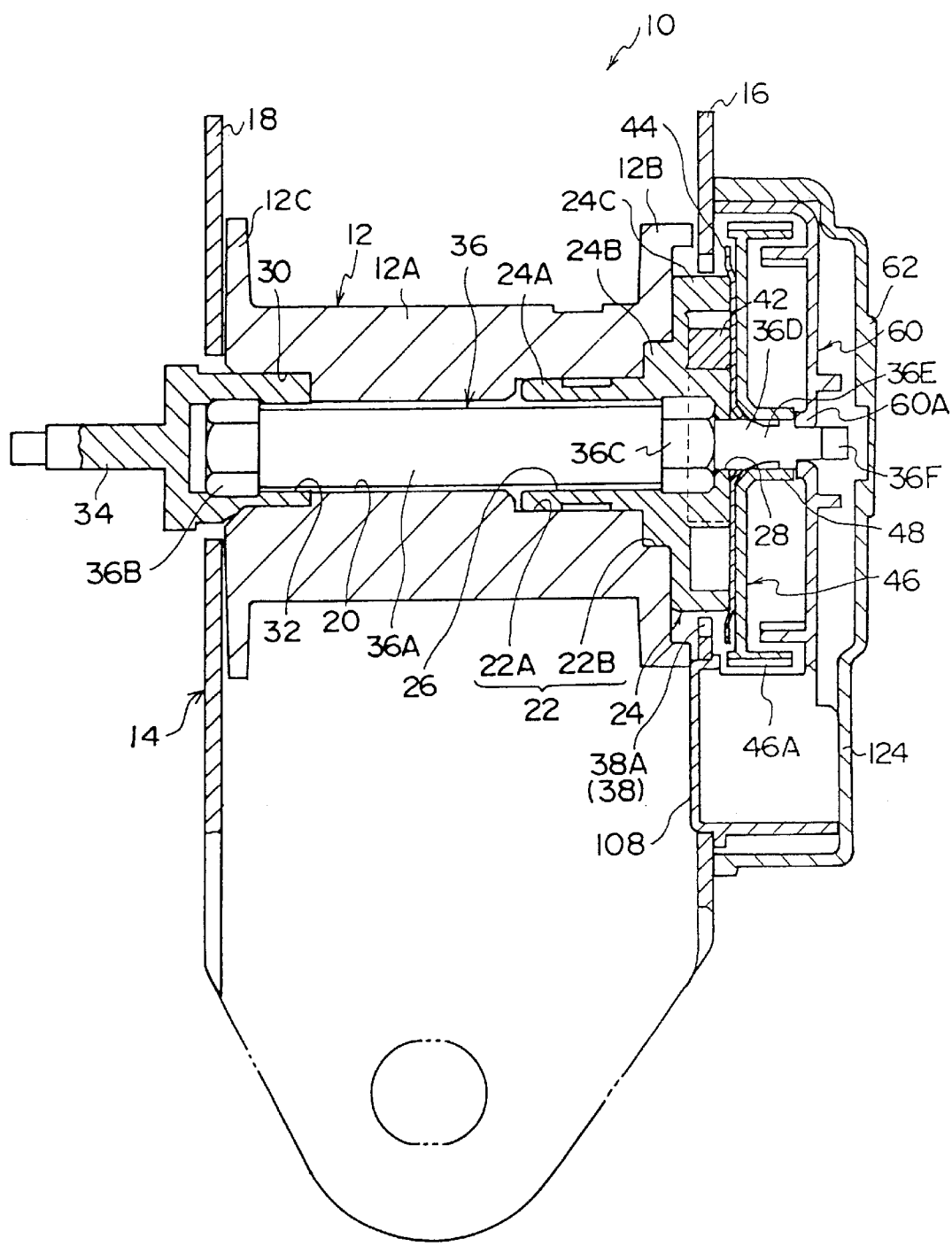

WEBBING RETRACTOR

BACKGROUND OF THE INVENTION

1. Field of the Invention

The present invention relates to a webbing retractor for a webbing belt which restrains a vehicle occupant.

2. Description of the Related Art

A locking device is provided at a webbing retractor which forms a main portion of what is known as a seat belt apparatus, which restrains a vehicle occupant by means of an elongated belt-shaped webbing belt. When a vehicle rapidly decelerates, the locking device locks a winding shaft to oppose a force applied by a body of the vehicle occupant, which begins to move toward the front of the vehicle due to inertia in the rapid deceleration state and starts to pull out the webbing belt. In this way, the locking device increases the restraining force of the webbing belt at the time of rapid deceleration of the vehicle.

An example of this type of locking device is briefly described below.

The locking device is provided with one or a plurality of lock plates attached to the winding shaft so as to be displaceable within a predetermined range along a radial direction of the winding shaft. Ratchet teeth are formed at an outer peripheral portion of each of these lock plates. When the lock plates are displaced, with respect to the winding shaft, outward in a radial direction of the winding shaft, the ratchet teeth mesh with ratchet teeth of a ratchet hole formed in one of a pair of leg plates that form a frame of the webbing retractor, thereby locking the winding shaft.

A rotating body is provided in a vicinity of these lock plates so as to be rotatable coaxially with the winding shaft. The rotating body is mechanically coupled to the winding shaft by an urging member such as a compression coil spring, a torsion coil spring, or the like, and rotates along with the winding shaft. When an external force that opposes this rotation with the winding shaft is applied to the rotating body, the urging member deforms elastically and the rotating body rotates relatively to the winding shaft. The rotating body is engaged with the lock plates, and when the rotating body rotates relative to the winding shaft, the lock plates are displaced outward in the radial direction of the winding shaft.

An acceleration sensor is provided at a side of the rotating body. The acceleration sensor is provided with a locking member which locks rotation of the rotating body when the acceleration sensor detects a vehicle deceleration of a predetermined magnitude or more.

When the body of the vehicle occupant pulls out a webbing belt due to inertia at a time of rapid deceleration of the vehicle, the winding shaft rotates in a pulling-out direction (i.e. in a direction in which the webbing belt is pulled out). However, when the acceleration sensor detects such a state of rapid deceleration, the locking member locks rotation of the rotating body, and therefore, relative rotation occurs between the winding shaft and the rotating body. The relative rotation of the rotating body at this time displaces the lock plates outward in the radial direction of the winding shaft. The rotation of the winding shaft is locked by the ratchet teeth of the lock plates meshing with the ratchet teeth of the ratchet hole, and pulling-out of the webbing belt is limited.

In the locking device described above, a compression coil spring may be used as the urging member. In the locking device described above, as well as in other devices, a compression coil spring may be attached by the following method. First, a cylindrical boss having a slightly smaller outside diameter than an inside diameter of the compression coil spring is formed as a projection, from a portion to which one end portion of the compression coil spring abuts, along an axial direction of the compression coil spring (specifically, the axial direction of the compression coil spring when it is regarded from the shape thereof as a cylinder). Then, the compression coil spring is attached to the boss such that the boss is inserted into the compression coil spring. Displacement of the compression coil spring in a direction perpendicular to the axial direction of the boss is limited by the boss.

The above-described method for attaching a compression coil spring is usual. However, it has the following problems when applied to attachment of a compression coil spring in the locking device described above.

In the locking device described above, a disc or the like for limiting displacement of the lock plates and of the winding shaft itself along the axial direction of the winding shaft is integrally provided at the winding shaft at a side of the lock plates opposite to the side at which the rotating body is disposed. Between the disc and the rotating body, the abutting portion and the boss described above are formed and the compression coil spring is disposed. In this case, an opening is provided in the rotating body in advance in order to facilitate attachment of the compression coil spring. The compression coil spring is disposed between the rotating body and the disc through this opening.

In order that the compression coil spring can be attached and that secure attachment can be confirmed, the opening needs to be formed so that one end of the opening in the longitudinal direction thereof is at a position which is almost coplanar with the plane in which the base portion of the boss exists and, further, the length from a position corresponding to a distal end of the boss to the other end portion of the opening in the longitudinal direction thereof is longer than the total length of the compression coil spring when the compression coil spring is fully compressed.

However, providing a boss at each of both longitudinal direction ends of the compression coil spring is fundamentally difficult. Hence, the compression coil spring is only supported by the boss provided at the one longitudinal direction end portion of the compression coil spring. Therefore, the other longitudinal direction end portion of the compression coil spring is extremely unstable, and the compression coil spring can easily come off through the opening having the size described above.

Further, when the compression coil spring is attached to a structure as described above, the compression coil spring cannot pass through the opening unless it is fully compressed in advance. Therefore, it is extremely difficult to automate the attachment process of the compression coil spring.

SUMMARY OF THE INVENTION

In view of the aforementioned, an object of the present invention is to provide a webbing retractor which facilitates reliable attachment of a compression coil spring, and from which such an attached compression coil spring does not easily come off.

A first aspect of the present invention is a webbing retractor for connection to an axially rotatable winding shaft having a webbing belt with an end, the end being connected to the winding shaft, which takes-up the webbing belt by rotation in a retracting direction, the webbing belt being for restraining a vehicle occupant, the winding shaft having a locking device with a rotating body coaxially rotatable with the winding shaft in a pulling-out direction, the pulling-out directing being opposite to the retracting direction, the locking device including a locking mechanism preventing rotation of the winding shaft in the pulling-out direction when there is a sudden vehicle deceleration, the webbing retractor including: a pair of wall portions with a first wall portion provided at the rotating body and a second wall portion provided at the winding shaft at a retracting direction side of the first wall portion and faces the first wall portion; a compression coil spring which is disposed between the pair of wall portions, and which is compressed by a pressing force applied from the second wall portion due to rotation of the winding shaft in the pulling-out direction, and which presses the first wall portion by restoring force from the compressed state of the compression coil spring; limiting portions, at least one of which is provided integrally with the rotating body and at least one of which is provided integrally with the winding shaft, and which limit at an outer side of the compression coil spring displacement of the compression coil spring along a direction perpendicular to an axis of the compression coil spring; and an insertion hole provided between the pair of wall portions and penetrating the rotating body at a position further toward the second wall portion than to the first wall portion, and an opening dimension of the insertion hole along a direction from the first wall portion to the second wall portion is larger than a total length of the compression coil spring in a compressed state and smaller than a total length of a natural length of the compression coil spring, and the compression coil spring is inserted through the insertion hole between the pair of wall portions and into a region at an inner side of the limiting portions from a side of the rotating body opposite a side at which the wall portions exist.

In the webbing retractor with the above structure, when the winding shaft rotates in the pulling-out direction in a normal state, the second wall portion provided at the winding shaft begins to compress the compression coil spring by pressing the compression coil spring in the pulling-out direction, and the compression coil spring receiving the pressing force presses the first wall portion provided at the rotating body by an elastic force thereof. Thus, the rotating body rotates in the pulling-out direction, following the rotation of the winding shaft.

When the webbing belt is pulled out and the winding shaft is rotated in the pulling-out direction in a state in which rotation of the rotating body is limited or an external force in the retracting direction is applied to the rotating body, the second wall portion compresses the compression coil spring whereas the first wall portion opposes the elastic force of the compression coil spring. Therefore, the rotating body rotates in the retracting direction relatively to the winding shaft. When the rotating body relatively rotates, the locking mechanism operates to lock rotation of the winding shaft in the pulling-out direction. Thus, the webbing belt cannot be pulled out further in this state.

Since displacement of the compression coil spring in a direction along a direction perpendicular to the axis of the compression coil spring is limited from the outer side of the compression coil spring by limiting portions provided at at least one of the rotating body and the winding shaft, malfunction or the like due to an inadvertent displacement of the compression coil spring in the direction perpendicular to the axis of the compression coil spring is prevented.

Further, since the limiting portions limit displacement of the compression coil spring at the outer side of the compression coil spring, it suffices for the compression coil spring to be inserted between the limiting portions when it is assembled. Therefore, assembly of the compression coil spring is easier than in a conventional structure in which displacement of the compression coil spring is limited by a boss.

Furthermore, in the present webbing retractor, even though the compression coil spring is still assembled by being inserted between the rotating body and the winding shaft through the insertion hole formed in the rotating body, the insertion hole opens at a wall portion other than the wall portion where the limiting portions of the rotating body and the winding shaft are provided, and the length of the insertion hole in a direction along the axial direction of the compression coil spring is long enough for the compression coil spring to be able to pass therethrough in a compressed state. Therefore, the length of the insertion hole in the direction along the axial direction of the compression coil spring can be made smaller than the length thereof in a conventional structure using a boss, and the compression coil spring can be prevented from coming off after assembly.

The webbing retractor of the present invention, preferably further includes a pressing portion provided integrally with the winding shaft at a side of the second wall portion which side is opposite to a side at which the first wall portion exists, the pressing portion pressing the first wall portion toward the retracting direction when the winding shaft rotates in the retracting direction.

In the webbing retractor of the above structure, when the winding shaft rotates in the retracting direction, the second wall portion moves in a direction of moving away from the first wall portion. However, in this case, the pressing portion presses the first wall portion provided at the rotating body side, and the rotating body thereby follows the rotation of the winding shaft in the retracting direction. That is, in the present webbing retractor, since the rotating body is made to follow the rotation of the winding shaft without using the elastic force of the compression coil spring when the winding shaft rotates in the retracting direction, the compression coil spring only need to be disposed between the pair of wall portions. Therefore, an end portion of the compression coil spring does not particularly need to be fixed, and assembly of the compression coil spring is even easier.

BRIEF DESCRIPTION OF THE DRAWINGS

FIG. 1 is an enlarged exploded perspective view of a structure of main portions of a webbing retractor relating to an embodiment of the present invention.

FIG. 3 is a sectional view along a line 3—3 of FIG. 2 showing how a compression coil spring is assembled into the webbing retractor.

FIG. 4 is a vertical sectional view showing an overall structure of the webbing retractor relating to the embodiment of the present invention.

DESCRIPTION OF THE PREFERRED EMBODIMENTS

Figure 2:
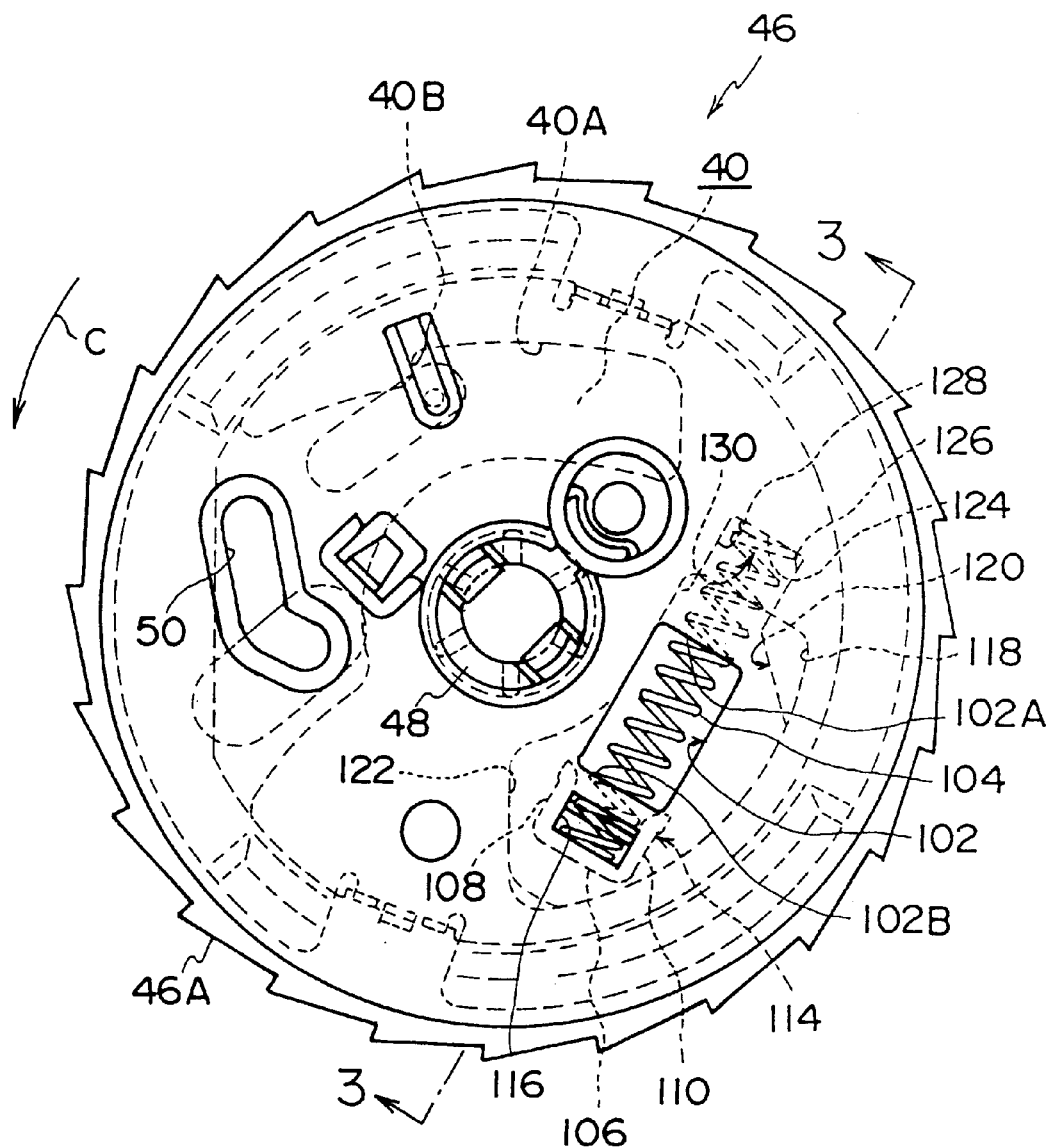
FIG. 2 is a plan view of a V-gear of the webbing retractor relating to the embodiment of the present invention.

FIG. 4 is a vertical sectional view illustrating an overall structure of a webbing retractor 10 relating to the present embodiment. As shown in this figure, the webbing retractor 10 includes a frame 14 formed, when viewed from above, substantially in a U shape. The frame 14 is fixed to a vehicle body. The frame 14 includes a first leg plate 16 and a second leg plate 18, which are extended parallel to each other. A spool 12 is a winding shaft which is made by die-casting. The spool 12 is rotatably supported between the first leg plate 16 and the second leg plate 18.

The spool 12 is formed by a cylindrical spool shaft 12A forming an axial center portion, and a pair of substantially disc-shaped flange portions, each of which is formed respectively at one of both end portions of the spool shaft 12A (hereinafter, the flange portion disposed at the first leg plate 16 side is called "first flange portion 12B" and the flange portion disposed at the second leg plate 18 side is called "second flange portion 12C").

A shaft insertion hole 20 is formed at the axial center portion of the spool shaft 12A. A base lock receiving portion 22 is coaxially formed as a recess which has a larger diameter than that of the shaft insertion hole 20, at the first flange portion 12B side of the shaft insertion hole 20. The base lock receiving portion 22 includes a recess body 22A, which forms most of the base lock receiving portion 22, and a recess end portion 22B, which has a larger diameter than that of the recess body 22A.

A base lock 24, which is made by die-casting, is mounted to the base lock receiving portion 22 such that removal of the base lock 24 therefrom is prevented. The base lock 24 is mounted by insertion of the base lock 24 into the base lock receiving portion 22, after which the base lock 24 is grasped by an unillustrated stopper (a removal prevention member), formed substantially in a U shape when viewed from the front and press fitted in a direction perpendicular to the axis. While the base lock 24 is made by die-casting in the present embodiment, the base lock 24 is not necessarily made by die-casting. As will be apparent from the operation and effects described later, the base lock 24 may be formed of a material which allows the base lock 24 to engage with ratchet teeth 38A by deforming plastically when the base lock 24 is pressed against the ratchet teeth 38A at a time of rapid deceleration of a vehicle.

The base lock 24 is formed in a cylindrical shape having a collar, and is formed by a base portion 24A which is fitted into the recess body 22A of the base lock receiving portion 22, an intermediate portion 24B which has a larger diameter than that of the base portion 24A and is fitted into the recess end portion 22B of the base lock receiving portion 22, and a retaining portion 24C which has a larger diameter than that of the intermediate portion 24B and is disposed so as to abut the outer side surface of the first flange portion 12B. A fitting hole 26 which is in a hexagon socket shape is formed at a portion of the base lock 24 other than an outer end of the axial center portion thereof. Further, a small hole 28 which communicates with the axial center portion of the fitting hole 26 and has a smaller diameter than that of the fitting hole 26 is formed at the outer end of the axial center portion of the base lock 24.

A sleeve receiving portion 30, which is a recess having a larger diameter than that of the shaft insertion hole 20, is formed at the second flange portion 12C side of the shaft insertion hole 20 of the spool shaft 12A. A female spline is formed at an inner circumferential portion of the sleeve receiving portion 30. A sleeve 34, having a male spline formed at an outer circumferential portion thereof and a hexagon socket-shaped fitting hole 32 formed at an axial center portion thereof, is fitted into the sleeve receiving portion 30. An inner end of an urging means (a power spring) which urges the spool 12 to rotate in a retracting direction (i.e., a direction opposite to a direction in which the webbing belt is pulled out) is secured to a tip portion of the sleeve 34 via an unillustrated adapter. The sleeve 34 with the structure described above is one of the structural components of a pretensioner which rotates the spool 12 in the retracting direction promptly at a time of rapid deceleration of the vehicle.

Figure 7:
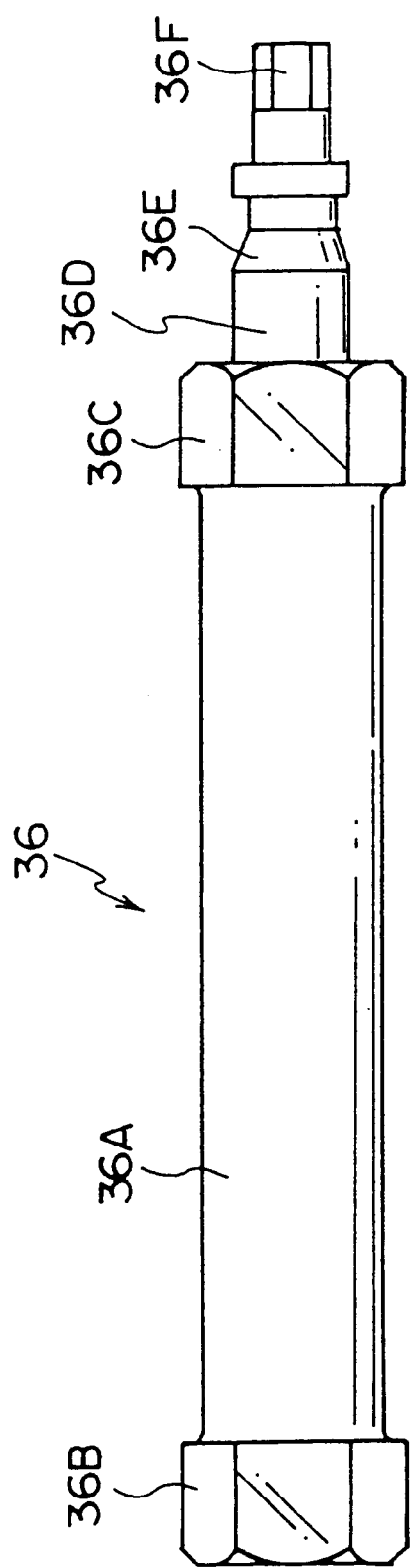
FIG. 7 is a front view of a torsion shaft shown in FIG. 4.
Figure 8:
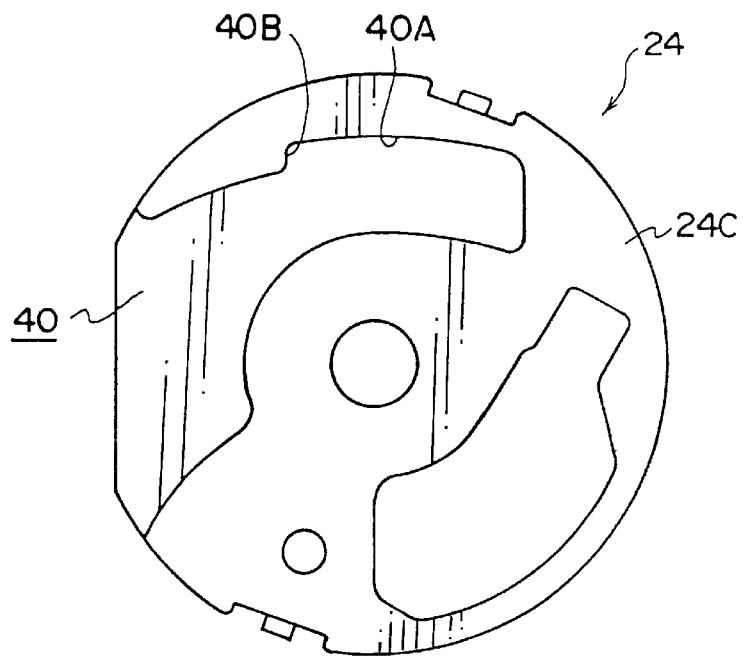
FIG. 8 is a side view of a base lock shown in FIG. 4.

The base lock 24 and sleeve 34 described above are coupled with each other through a torsion shaft 36. As also shown in FIG. 7, the torsion shaft 36 is formed by a shaft portion 36A which forms the main portion thereof, a hexagonal head portion 36B which is formed at one end portion of the shaft portion 36A, a hexagonal fitting portion 36C which is formed at the other end portion of the shaft portion 36A, a small diameter portion 36D extended coaxially with the shaft portion 36A from the axial center portion of the fitting portion 36C, a gear-holding portion 36E whose diameter is reduced from that of the small diameter portion 36D through a tapered surface, and subsequently increased so as to form an annulus, and a tip portion 36F extended coaxially further from the gear-holding portion 36E and having a key formed thereat. As shown in FIG. 4, the head portion 36B of the torsion shaft 36 is fitted into the hexagon socket-shaped fitting hole 32 formed in the sleeve 34, and the fitting portion 36C of the torsion shaft 36 is fitted into the hexagon socket-shaped fitting hole 26 formed in the base lock 24. The torsion shaft 36 is thereby integrated with the spool shaft 12A via the base lock 24 and the sleeve 34. The torsion shaft 36 of the structure described above is a main structural component of a force limiter which performs energy absorption by torsional deformation when a webbing tension greater than a predetermined value acts on the spool 12 at a time of rapid deceleration of the vehicle.

Figure 5:
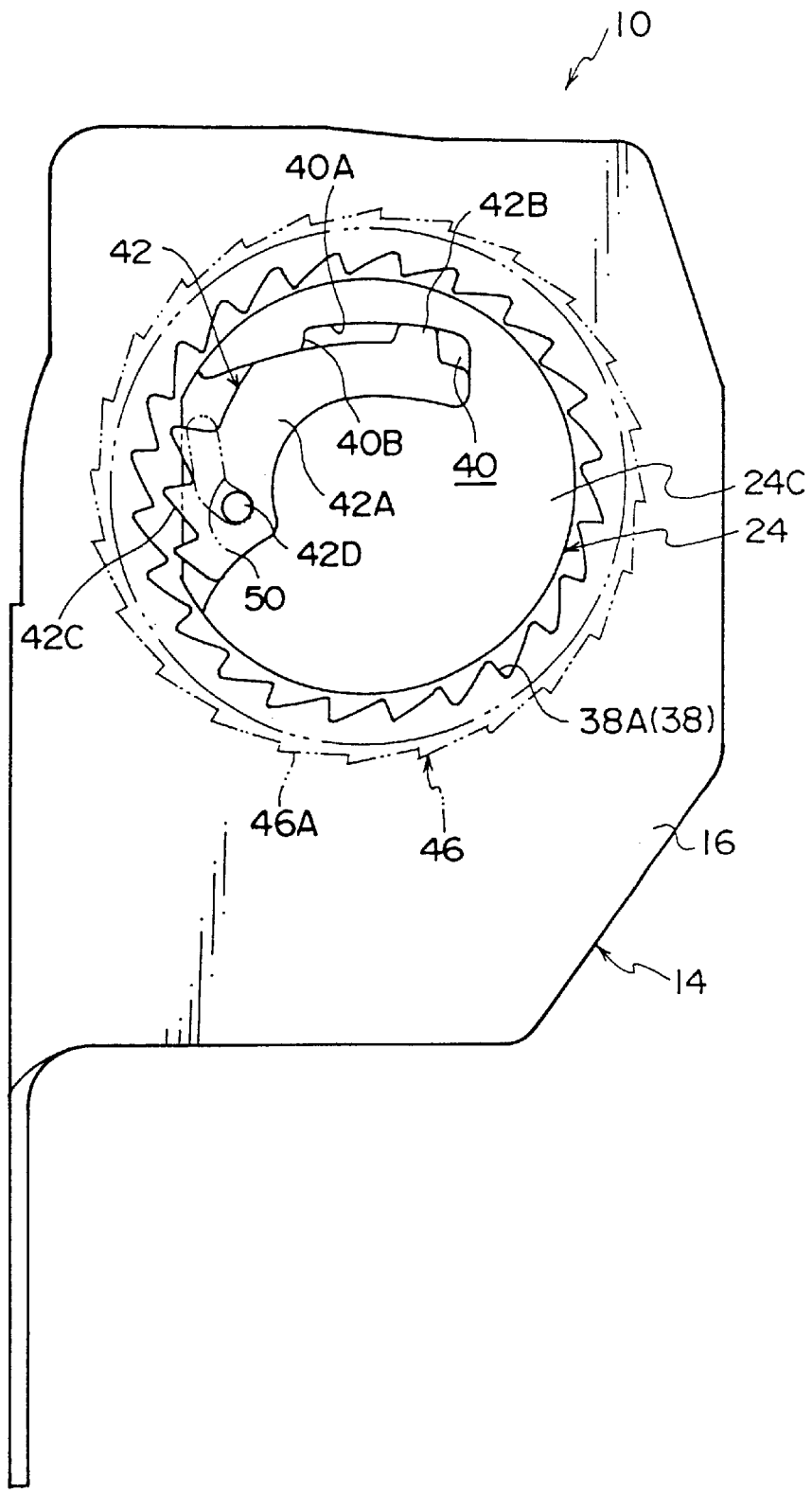
FIG. 5 is a side view showing an unlocked state of the webbing retractor relating to the embodiment of the present invention.
Figure 6:
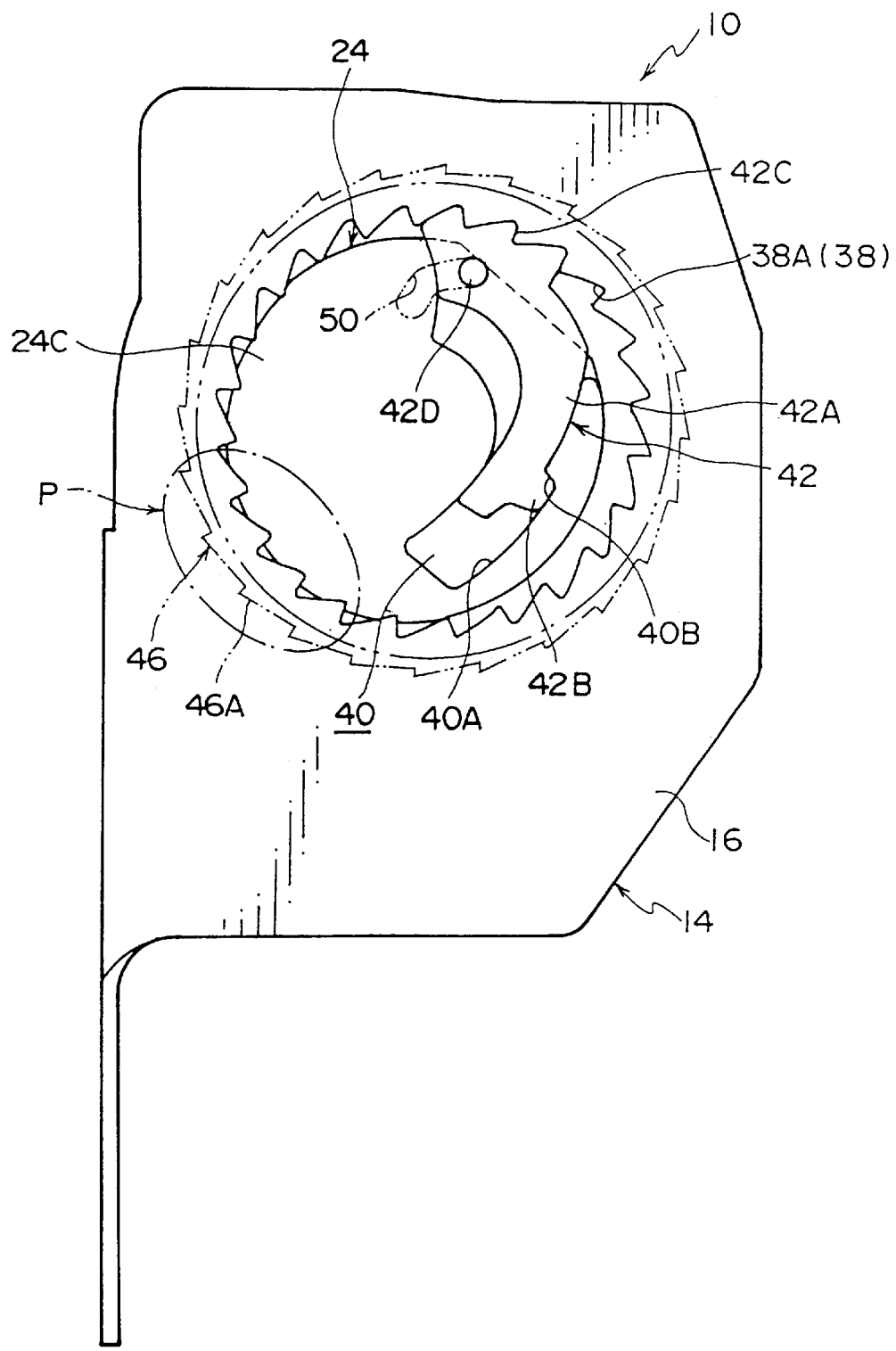
FIG. 6 is a side view showing a locked state of the present webbing retractor relating to the embodiment of the present invention.

As shown in FIGS. 5 and 6, an internal-teeth ratchet 38 is formed, by punching, at an upper portion of the first leg plate 16 of the frame 14. Ratchet teeth 38A of the internal-teeth ratchet 38 are formed so as to have high strength.

The retaining portion 24C of the base lock 24 is disposed inside the internal-teeth ratchet 38. The small diameter portion 36D of the torsion shaft 36 is inserted into the aforementioned small hole 28 formed at the axial center portion of the retaining portion 24C. An accommodating portion 40 (see FIGS. 2, 5, 6, and 8) is a recess formed at the front side of the retaining portion 24C in the peripheral direction of the small hole 28. One end portion of the accommodating portion 40 is closed, while the other end portion of the accommodating portion 40 is open. The other end portion side of the accommodating portion 40 is beveled so as not to interrupt the engaging movement of a lock plate 42 (described below) with the internal-teeth ratchet 38. The single lock plate 42 is overall substantially in a circular arc plate shape (see FIGS. 5, 6, and 9) and forms a locking device as one of the structural components of a locking mechanism. The lock plate 42 is accommodated in the accommodating portion 40. A thin disc shaped lock cover 44 is non-rotatably attached to the outer surface of the retaining portion 24C of the base lock 24, in order to prevent the lock plate 42 from falling out.

Figure 9:
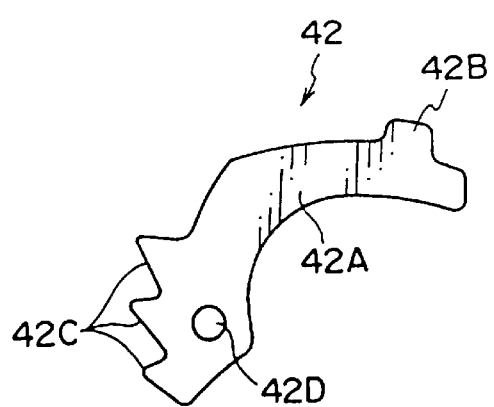
FIG. 9 is a front view of a lock plate shown in FIG. 4.

As shown in FIG. 9 and other figures, the lock plate 42 is formed of a plate body 42A substantially in a circular arc plate shape and made of metal, a rectangular projecting portion 42B extending from one end portion of the plate body 42A, high strength locking teeth 42C formed at the peripheral portion of the other end portion of the plate body 42A which mesh with the ratchet teeth 38A of the internal-teeth ratchet 38 of the first leg plate 16, and a guide pin 42D standing from the other end portion of the plate body 42A. The added length of the width of the plate body 42A and the projecting length of the projecting portion 42B is approximately equal to the width of a wide portion 40A of the accommodating portion 40 of the base lock 24 (see FIGS. 5 and 6).

A substantially disc-shaped V-gear 46, which is a rotating body forming the locking device and which has a diameter larger than that of the base lock 24, is disposed at a position adjacent to the base lock 24. As shown in FIG. 2, a cylindrical boss 48 is formed at the axial center portion of the V-gear 46, and is rotatably supported by the gear-holding portion 36E of the torsion shaft 36 so as to enable rotation of the V-gear 46 following rotation of the torsion shaft 36. Further, a substantially L-shaped curved guide hole 50 is formed in the V-gear 46. The guide pin 42D standing from the lock plate 42 is inserted into the guide hole 50. Further, locking teeth 46A are integrally formed at the outer peripheral portion of the V-gear 46.

As shown in FIGS. 1 through 3, a rectangular insertion hole 102 is formed through the V-gear 46 along the thickness direction thereof between the central portion and the peripheral portion thereof. The insertion hole 102 is in a rectangular shape whose longitudinal axis forms a string of an assumed arc on the V-gear 46. The total length in the longitudinal direction of the insertion hole 102 is shorter than the natural length of the compression coil spring 104 shown in FIGS. 1 through 3, and is longer than or equal to the length of the compression coil spring 104 when it is fully compressed. Further, the length in the width direction of the insertion hole 102 is longer than the outside diameter dimension of the compression coil spring 104.

Further, a wall portion 106 is formed, as a wall portion of a rotating body (one of a pair of wall portions), at an end surface that faces the base lock 24 when the V-gear is assembled. Of two longitudinal direction end portions of the insertion hole 102 described above, an end portion 102A is relatively in the retracting direction, which is the direction of rotation of the spool 12 when the spool 12 is retracting the unillustrated webbing belt (the direction of arrow C in FIG. 2), and the other end is an end portion 102B. The wall portion 106 is formed on the opposite side of the end portion 102B from the end portion 102A, at a position spaced from the end portion 102A by a predetermined distance along the longitudinal direction of the insertion hole 102.

The distance from the end portion 102A of the insertion hole 102 to the wall portion 106 is such that the total longitudinal direction dimension of the insertion hole 102 (including the distance from the wall portion 106 to the other insertion hole 102 longitudinal direction end portion 102B) is sufficiently shorter than the natural length of the compression coil spring 104.

A pair of limiting walls 108 and 110 are formed, as limiting portions, at both end portions of the wall portion 106 in the width direction thereof toward the end portion 102B of the insertion hole 102. Further, a limiting wall 112 is formed as a limiting portion from an end portion of the wall portion 106 which is opposite to a portion coupled to the V-gear 46, so as to connect the limiting walls 108 and 110. The limiting wall 112 and the limiting walls 108 and 110 together make up a spring box 114. A distance between the limiting walls 108 and 110 and a distance between the limiting wall 112 and the V-gear 46 are both slightly larger than the outside diameter dimension of the compression coil spring 104. One end portion of the compression coil spring 104 in the axial direction thereof (specifically, the axial direction of the compression coil spring 104 when it is regarded from the form thereof as a cylinder) is accommodated inside the spring box 114, and the one end portion of the compression coil spring 104 abuts the inside of the spring box 114 when accommodated therein.

Further, a rectangular small window 116 is formed through the V-gear 46 along the thickness direction thereof. The small window 116 is formed so as to have longitudinal sides along the width direction of the insertion hole 102. Both end portions of the small window 116 in the longitudinal direction thereof correspond to the limiting walls 108 and 110, and the one end portion in the width direction of the small window 116 corresponds to the wall portion 106. Thus, the small window 116 communicates between the inside of the spring box 114 and an opposite side of the V-gear 46 from the spring box 114, and the vicinity of a bottom portion of the spring box 114 (i.e. the limiting wall 112) can be inspected from this opposite side.

A through-hole 118, which is substantially in a shape of a traditional fan and through which the spring box 114 passes when the V-gear 46 is in an assembled state, is formed in the aforementioned lock cover 44. The through-hole 118 is formed so that not only can the spring box 114 pass through the through-hole 118 but also, while passed through the through-hole 118, the spring box 114 can rotate within a predetermined angle around the center of the V-gear 46. Thus, relative rotation of the V-gear 46 coaxially with the lock cover 44 is enabled within the predetermined angle.

Further, a spring-accommodation portion 120, which accommodates the compression coil spring 104 and the spring box 114 which passes through the through-hole 118 when the V-gear 46 is in an assembled state, is formed at the retaining portion 24C of the aforementioned base lock 24.

The spring-accommodation portion 120 is a recess with an open end portion, which is at a side corresponding to the V-gear 46 when the base lock 24 and the V-gear 46 are in an assembled state. A portion of the spring-accommodation portion 120 has substantially the same form as the aforementioned through-hole 118. A portion of the inside peripheral wall that is relatively toward a pulling-out direction side (i.e., a direction of rotation when the webbing belt is pulled out) of the spring-accommodation portion 120 is a pressing wall 122, which serves as a pressing portion. When the base lock 24 rotates in the retracting direction, which is opposite to the pulling-out direction, the pressing wall 122 presses the spring box 114. On the other hand, the inside peripheral wall of the spring-accommodation portion 120 further toward the retracting direction side than an intermediate portion of the spring-accommodation portion 120, along the direction of the rotation, forms a limiting recess 130, made up of a wall portion 124 and limiting walls 126 and 128, which face each other.

A dimension between the limiting walls 126 and 128 of the limiting recess 130 is slightly larger than the outside diameter dimension of the compression coil spring 104. Therefore, a portion of the axial direction other end of the compression coil spring 104 can be accommodated between the limiting walls 126 and 128. The wall portion 124 of the limiting recess 130 faces the wall portion 106 generally along the longitudinal direction of the aforementioned insertion hole 102. When the V-gear 46, the base lock 24, and the compression coil spring 104 are in an assembled state, the other axial direction end portion of the compression coil spring 104 abuts the wall portion 124.

Figure 10:
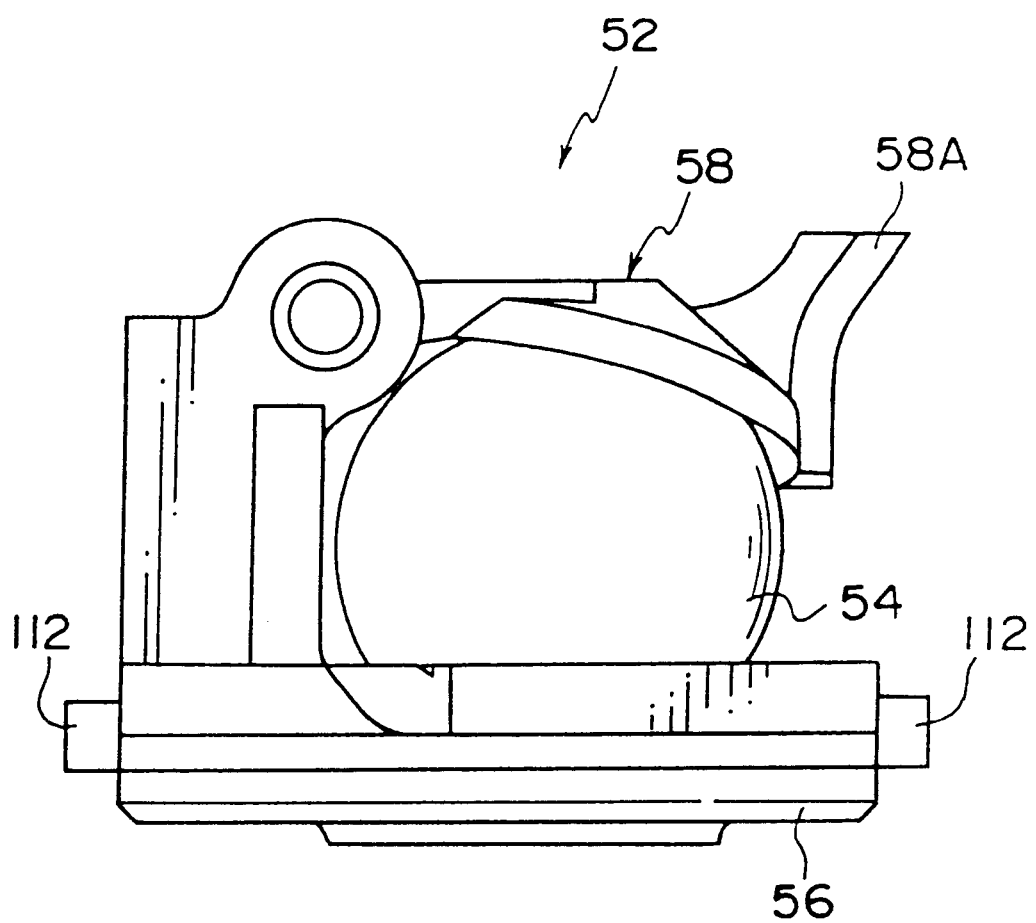
FIG. 10 is a side view of an acceleration sensor which is not illustrated in FIG. 4.

A known acceleration sensor 52 for VSIR (Vehicle Sensitive Inertia Reel) which forms a locking device as one of the structural components of the locking mechanism is provided at the lower side of the V-gear 46 (see FIG. 10). The acceleration sensor 52 is not illustrated in FIG. 4. At a time of rapid deceleration of the vehicle, a ball 54 of the acceleration sensor 52 rolls over a sensor housing 56 to swing a sensor lever 58, and then a locking pawl 58A of the sensor lever 58 engages with the locking teeth 46A of the V-gear 46.

As shown in FIG. 4, the acceleration sensor 52 is held by a sensor holder 60 serving as a cover and made of resin. A sensor cover 62 made of resin and having a shape similar to the sensor holder 60 is provided outside the sensor holder 60. The sensor holder 60 and the sensor cover 62 are fixed together as one body to the first leg plate 16 of the frame 14. A short cylindrical boss 60A is integrally formed at the axial center portion of the sensor holder 60, and the boss 60A is rotatably supported by the tip portion 36F of the torsion shaft 36. That is, the sensor holder 60 is allowed to function as a bearing for the torsion shaft 36. In that sense, the sensor holder 60 is an element which may in a broad sense be regarded as a bearing member or a supporting member. From a more simplistic point of view, the sensor holder 60 could also be regarded as a holding member or a cover body.

Internal teeth which can engage with a pawl for an unillustrated WSIR (Webbing Sensitive Inertia Reel), which pawl is rotatably supported by the V-gear 46, are integrally formed at an inside peripheral portion of the sensor holder 60.

The operation and effects of the present embodiment are described next.

A vehicle occupant holds an unillustrated tongue plate which is inserted through the webbing and pulls out the webbing belt from the spool 12 against the urging force of the power spring, and then engages the tongue plate with an unillustrated buckle device. Thus, the occupant is fastened by the webbing of a three-point seat belt apparatus. Specifically, a portion of the webbing belt from an unillustrated shoulder anchor provided at an upper portion of a center pillar to the tongue plate is a shoulder webbing belt, and a portion of the webbing belt from the tongue plate to the webbing retractor is a lap webbing belt.

In a case of a normal pulling-out of the webbing belt as described above, when the spool 12 is rotated in the pulling-out direction by the vehicle occupant pulling the webbing belt, the wall portion 124, which is a part of the inside peripheral wall of the spring-accommodation portion 120 of the base lock 24 which is provided integrally with the spool 12, begins to compress the compression coil spring 104 by pressing the axial direction other end portion thereof. When the compression coil spring 104 is acted on by the pressing force from the wall portion 124, the compression coil spring 104 presses with an elastic force thereof the wall portion 106, to which the axial direction one end portion of the compression coil spring 104 abuts and rotates the V-gear 46 in the pulling-out direction. Therefore, at a normal pulling-out, the V-gear 46 rotates along with the spool 12.

When the vehicle, having gone from this state to a driving state, rapidly decelerates, an unillustrated pretensioner operates via the sleeve 34 to rotate the spool 12 promptly in the retracting direction. At the same time, the acceleration sensor 52 detects the rapid deceleration of the vehicle. That is, the ball 54 of the acceleration sensor 52 rolls over the sensor housing 56 and swings the sensor lever 58. The locking pawl 58A of the sensor lever 58 thereby engages with the locking teeth 46A of the V-gear 46 to block rotation of the V-gear 46 in the pulling-out direction.

Meanwhile, the body of the vehicle occupant, which begins to move toward the front of the vehicle due to inertia at the time of rapid deceleration, pulls the webbing belt which is applied to the vehicle occupant, and the spool 12 begins to rotate in the pulling-out direction due to tension applied to the webbing by the vehicle occupant. Therefore, a relative rotation is generated between the spool 12 beginning to rotate in the pulling-out direction and the V-gear 46, whose rotation in the pulling-out direction is blocked. The relative rotation opposes the urging force of the compression coil spring 104. As can be seen by comparing FIGS. 5 and 6, when the relative rotation between the spool 12 and the V-gear 46 is generated, the guide pin 42D of the lock plate 42, which is retained in the accommodating portion 40 formed at the retaining portion 24C of the base lock 24, is guided by the guide hole 50 of the V-gear 46 and moved outward substantially in a radial direction of the base lock 24. The locking teeth 42C of the lock plate 42 thereby mesh with the ratchet teeth 38A of the internal-teeth ratchet 38 which is provided at the first leg plate 16 of the frame 14.

Further, when the locking teeth 42C of the lock plate 42 mesh with the ratchet teeth 38A of the internal-teeth ratchet 38 at this time, a reaction force acts on the retaining portion 24C of the base lock 24. This reaction force is significantly large, because it is generated by meshing of the high strength lock teeth 42C and the ratchet teeth 38A at the time of rapid deceleration of the vehicle, and naturally acts as well on the torsion shaft 36 passing through the axial center portion of the base lock 24. Furthermore, since the tip portion 36F of the torsion shaft 36 is rotatably supported by the boss 60A of the resin sensor holder 60, the reaction force acts on the boss 60A through the tip portion 36F and elastically deforms the boss 60A in an acting direction of the reaction force, which is a direction away from an engaging position of the lock plate 42. Therefore, a portion of the periphery of the retaining portion 24C of the base lock 24 is pressed hard against the ratchet teeth 38A of the internal-teeth ratchet 38. Since the base lock 24 is produced by die-casting and is relatively soft, when it is pressed against the ratchet teeth 38A, it plastically deforms and is cut by the ratchet teeth 38A. Thus, the base lock 24 and the ratchet teeth 38A are directly engaged. As a result, in the present embodiment, locking is obtained at two points opposing each other in a radial direction and sufficient locking strength can be ensured.

The compression coil spring 104 is employed in the present embodiment as a means to make the V-gear rotate along with the spool 12 in the case of a normal pulling-out, and make the V-gear 46 rotate relatively to the spool 12 when the V-gear is locked, as described above.

A procedure of an assembly operation of the compression coil spring 104 during assembly of the webbing retractor 10 is described below.

As shown in FIG. 3, when the base lock 24, the lock cover 44, and the V-gear 46 of the present webbing retractor 10 are in an assembled state, first the axial direction other end portion of the compression coil spring 104 is inserted into the spring-accommodation portion 120, through the insertion hole 102 formed in the V-gear 46, and is abutted against the wall portion 124.

Then, a pressing force is applied to the axial direction one end portion of the compression coil spring 104 to compress the compression coil spring 104. When the compression coil spring 104 is compressed to a length short enough that the axial direction one end portion of the compression coil spring 104 can pass through the insertion hole 102, the axial direction one end portion of the compression coil spring 104 is inserted through the insertion hole 102 into the spring-accommodation portion 120. When the axial direction one end portion of the compression coil spring 104 is accommodated in the spring-accommodation portion 120, the pressing force applied to the compression coil spring 104 is released. The compression coil spring 104 elongates, trying to return to its natural length because of the elastic force therein, and abuts the wall portion 106 which forms the spring box 114. Thus, assembly of the compression coil spring 104 is completed.

Displacement of the thus assembled compression coil spring 104 along the axial direction of the spool 12 is limited by the limiting wall 112, the bottom portion of the spring-accommodation portion 120, and the V-gear 46. Moreover, displacement of the compression coil spring 104 in a direction along the width direction of the insertion hole 102 is limited by the limiting walls 108, 110, 126, and 128. Therefore, no malfunctions due to inadvertent displacement of the compression coil spring 104 will occur.

Further, since the limiting walls 108, 110, 126, and 128 limit displacement of the compression coil spring 104 at both ends thereof 104 in the present webbing retractor 10, both ends of the compression coil spring 104 are in a stable state. Moreover, unlike conventional methods for attaching a compression coil spring, there is no boss. Therefore, a portion of for of a compression coil spring insertion opening (which is equivalent to the insertion hole 102 in the present webbing retractor 10) corresponding in conventional methods to a length from a base portion to a tip portion of a boss is not necessary. Hence, the size of the insertion hole 102 in the longitudinal direction thereof can be reduced. Thus, the compression coil spring 104 can be reliably prevented from coming out, being removed, or the like from the insertion hole 102.

Further, as described in the aforementioned assembling procedure, since the compression coil spring 104 is compressed at assembly in such a state that the axial direction other end portion of the compression coil spring 104 is abutted against the wall portion 124, the compression coil spring 104 can be compressed by a pressing force applied only to the axial direction one end portion of the compression coil spring 104. Therefore, no special support is necessary at the other end portion of the compression coil spring 104 in the axial direction thereof.

Thus, since the compression coil spring 104 can be easily assembled and, moreover, the compression coil spring 104 can be compressed by a pressing force applied only to the axial direction one end portion of thereof, the assembly process can be automated using a robot or the like.

As described above, in the present invention, a compression coil spring can be easily and reliably attached, and the attached compression coil spring will not easily come off.

What is claimed is:

1. A webbing-retractor for connection to an axially rotatable winding shaft having a webbing belt with an end, the end being connected to the winding shaft, which takes-up the webbing belt by rotation in a retracting direction, the webbing belt being for restraining a vehicle occupant, the winding shaft having a locking device with a rotating body coaxially rotatable with said winding shaft in a pulling-out direction, the pulling-out directing being opposite to said retracting direction, the locking device including a locking mechanism preventing rotation of said winding shaft in the pulling-out direction when there is a sudden vehicle deceleration, said webbing retractor comprising:

a pair of wall portions with a first wall portion provided at said rotating body and a second wall portion provided at said winding shaft at a retracting direction side of said first wall portion and faces said first wall portion;

a compression coil spring which is disposed between said pair of wall portions, and which is compressed by a pressing force applied from said second wall portion due to rotation of said winding shaft in the pulling-out direction, and which presses said first wall portion by restoring force from the compressed state of said compression coil spring;

limiting portions, at least one of which is provided integrally with said rotating body and at least one of which is provided integrally with said winding shaft, and which limit at an outer side of said compression coil spring displacement of said compression coil spring along a direction perpendicular to an axis of said compression coil spring; and an insertion hole provided between said pair of wall portions and penetrating said rotating body at a position further toward said second wall portion than to said first wall portion, and an opening dimension of said insertion hole along a direction from said first wall portion to said second wall portion is larger than a total length of said compression coil spring in a compressed state and smaller than a total length of a natural length of said compression coil spring, and said compression coil spring is inserted through said insertion hole between said pair of wall portions and into a region at an inner side of said limiting portions from a side of said rotating body opposite a side at which said wall portions exist.

2. A webbing retractor according to claim 1, further comprising a pressing portion provided integrally with said winding shaft at a side of said second wall portion which side is opposite to a side at which said first wall portion exists, said pressing portion pressing said first wall portion toward the retracting direction when said winding shaft rotates in the retracting direction.

3. A webbing retractor according to claim 1, wherein said winding shaft has a torsion shaft formed integrally with a cylindrical member having a collar.

4. A webbing retractor according to claim 1, wherein said locking mechanism is provided with a sensor device and a plate member which limits rotation of said winding shaft by meshing with ratchet teeth formed at a frame.

5. A webbing retractor according to claim 1, wherein said rotating body is rotatably supported at a retaining portion of said winding shaft.

6. A webbing retractor according to claim 3, wherein said cylindrical member having a collar is produced by die-casting.

7. A webbing retractor according to claim 3, wherein said torsion shaft has a rotating body holding portion.

8. A webbing retractor according to claim 3, wherein said rotating body is provided with teeth integrally formed at an outer periphery of said rotating body, and is rotatably supported at said torsion shaft.

9. A webbing retractor according to claim 4, wherein said sensor device has an engaging portion which engages with said rotating body and a lever which can be swung.

10. A webbing retractor according to claim 4, wherein
said plate member is provided with a meshing portion which meshes with said rotating body, and a guide member which is inserted into a hole portion formed in said rotating body and guides movement of said plate member.

11. A webbing-retractor for connection to an axially rotatable winding shaft having a webbing belt with an end, the end being connected to the winding shaft, which takes-up the webbing belt by rotation in a retracting direction, the webbing belt being for restraining a vehicle occupant, the winding shaft having a locking device with a rotating body coaxially rotatable with said winding shaft in a pulling-out direction, the pulling-out directing being opposite to said retracting direction, the locking device including a locking mechanism preventing rotation of said winding shaft in the pulling-out direction when there is a sudden vehicle deceleration, said webbing retractor comprising:

a pair of wall portions with a first wall portion provided at said rotating body and a second wall portion provided at said winding shaft at a retracting direction side of said first wall portion and faces said first wall portion;

a compression coil spring which is disposed between said pair of wall portions, and which is compressed by a pressing force applied from said second wall portion due to rotation of said winding shaft in the pulling-out direction, and which presses said first wall portion by restoring force from the compressed state of said compression coil spring;

limiting portions, at least one of which is provided integrally with said rotating body and at least one of which is provided integrally with said winding shaft, and which limit at an outer side of said compression coil spring displacement of said compression coil spring along a direction perpendicular to an axis of said compression coil spring;

a pressing portion provided integrally with said winding shaft at a side of said second wall portion which side is opposite to a side at which said first wall portion exists, said pressing portion pressing said first wall portion toward the retracting direction when said winding shaft rotates in the retracting direction, and an insertion hole provided between said pair of wall portions and penetrating said rotating body at a position further toward said second wall portion than to said first wall portion, and an opening dimension of said insertion hole along a direction from said first wall portion to said second wall portion is larger than a total length of said compression coil spring in a compressed state and smaller than a total length of an uncompressed length of said compression coil spring, and said compression coil spring is inserted through said insertion hole between said pair of wall portions and into a region at an inner side of said limiting portions from a side of said rotating body opposite a side at which said wall portions exist.

12. A webbing retractor according to claim 11, wherein said winding shaft has a torsion shaft formed integrally with a cylindrical member having a collar.

13. A webbing retractor according to claim 11, wherein said locking mechanism is provided with a sensor device and a plate member which limits rotation of said winding shaft by meshing with ratchet teeth formed at a frame.

14. A webbing retractor according to claim 11, wherein said rotating body is rotatably supported at a retaining portion of said winding shaft.

15. A webbing-retractor for connection to an axially rotatable winding shaft having a webbing belt with an end, the end being connected to the winding shaft, which takes-up the webbing belt by rotation in a retracting direction, the webbing belt being for restraining a vehicle occupant, the winding shaft having a locking device with a rotating body coaxially rotatable with said winding shaft in a pulling-out direction, the pulling-out directing being opposite to said retracting direction, the locking device including a locking mechanism preventing rotation of said winding shaft in the pulling-out direction when there is a sudden vehicle deceleration, said webbing retractor comprising:

a pair of wall portions with a first wall portion provided at said rotating body and a second wall portion provided at said winding shaft at a retracting direction side of said first wall portion and faces said first wall portion;

a compression coil spring which is disposed between said pair of wall portions, and which is compressed by a pressing force applied from said second wall portion due to rotation of said winding shaft in the pulling-out direction, and which presses said first wall portion by restoring force from the compressed state of said compression coil spring;

a pressing portion provided integrally with said winding shaft at a side of said second wall portion which side is opposite to a side at which said first wall portion exists, said pressing portion pressing said first wall portion toward the retracting direction when said winding shaft rotates in the retracting direction;

an insertion hole provided between said pair of wall portions and penetrating said rotating body at a position further toward said second wall portion than to said first wall portion, and an opening dimension of said insertion hole along a direction from said first wall portion to said second wall portion is larger than a total length of said compression coil spring in a compressed state and smaller than a total length of a natural length of said compression coil spring, and said compression coil spring is inserted through said insertion hole between said pair of wall portions and into a region at an inner side of said limiting portions from a side of said rotating body opposite a side at which said wall portions exist, and limiting portions, at least one of which is provided integrally with said rotating body and at least one of which is provided integrally with said winding shaft, and which limit at an outer side of said compression coil spring displacement of said compression coil spring along a direction perpendicular to an axis of said compression coil spring.

16. A webbing retractor according to claim 15, wherein said winding shaft has a torsion shaft formed integrally with a cylindrical member having a collar.

17. A webbing retractor according to claim 15, wherein said locking mechanism is provided with a sensor device and a plate member which limits rotation of said winding shaft by meshing with ratchet teeth formed at a frame.

18. A webbing retractor according to claim 15, wherein said rotating body is rotatably supported at a retaining portion of said winding shaft.

* * * * *